(12) United States Patent
Wong et al.

(10) Patent No.: US 6,920,259 B2
(45) Date of Patent: Jul. 19, 2005

(54) LONGITUDINAL ELECTROMAGNETIC LATCHING OPTICAL RELAY

(75) Inventors: Marvin Glenn Wong, Woodland Park, CO (US); Arthur Fong, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 43 days.

(21) Appl. No.: 10/412,868

(22) Filed: Apr. 14, 2003

(65) Prior Publication Data

US 2004/0202410 A1 Oct. 14, 2004

(51) Int. Cl.[7] ............................ G02B 6/26; G02B 6/42
(52) U.S. Cl. .......................... 385/16; 385/15; 385/17; 385/18; 385/19
(58) Field of Search ................. 385/15–19, 22

(56) References Cited

U.S. PATENT DOCUMENTS

| 2,312,672 A | 3/1943 | Pollard, Jr. |
| 2,564,081 A | 8/1951 | Schilling |
| 3,430,020 A | 2/1969 | Von Tomkewitsch et al. |

(Continued)

FOREIGN PATENT DOCUMENTS

| EP | 0593836 A1 | 10/1992 |
| FR | 2418539 A | 9/1979 |
| FR | 2458138 A1 | 10/1980 |
| FR | 2667396 | 9/1990 |
| JP | SHO 36-18575 | 10/1961 |
| JP | SHO 47-21645 | 10/1972 |
| JP | 63-276838 | 5/1987 |
| JP | 01-294317 | 5/1988 |
| JP | 08-125487 A | 5/1996 |
| JP | 9161640 A | 6/1997 |
| WO | WO 99/46624 A1 | 9/1999 |

OTHER PUBLICATIONS

Bhedwar, Homi C. et al. "Ceramic Multilayer Package Fabrication." Electronic Materials Handbook, Nov. 1989, pp. 460–469, vol. 1 Packaging, Section 4: Packages.

"Integral Power Resistors for Aluminum Substrate." IBM Technical Disclosure Bulletin, Jun. 1984, US, Jun. 1, 1984, p. 827, vol. 27, No. 1B, TDB–ACC–NO: NB8406827, Cross Reference: 0018–8689–27–IB–827.

Kim, Joonwon et al. "A Micromechanical Switch with Electrostatically Driven Liquid–Metal Droplet." Sensors and Actuators, A: Physical. v 9798, Apr. 1, 2002, 4 pages.

Jonathan Simon, "A Liquid–Filled Microrelay With A Moving Mercury Microdrop" (Sep., 1997) Journal of Microelectromechinical Systems, vol. 6, No. 3, PP 208–216.

Marvin Glenn Wong, "A Piezoelectrically Actuated Liquid Metal Switch", May 2, 2002, patent application (pending), 12 pages of specification, 6 pages of claims, 1 page of abstract, and 10 sheets of drawings (Fig. 1–10).

*Primary Examiner*—John R. Lee
*Assistant Examiner*—Paul M. Gurzo (57) ABSTRACT

An electromagnetic optical relay is disclosed in which a solid slug moves within a switching channel formed in relay housing. An optical path passing through the switching channel is blocked or unblocked by motion of the solid slug. Motion of the solid slug is controlled by at least two electromagnetic actuators, such as electrical coils surround the switching channel. Motion of the solid slug is resisted by a liquid, such as a liquid metal, that wets between the solid slug and at least one fixed contact pad in the switching channel. The surface tension of the liquid provides a latching mechanism for the relay. An optical signal may be reflected from the wetted surface of the solid slug and switched to an alternative optical path.

32 Claims, 6 Drawing Sheets

U.S. PATENT DOCUMENTS

| | | |
|---|---|---|
| 3,529,268 A | 9/1970 | Rauterberg |
| 3,600,537 A | 8/1971 | Twyford |
| 3,639,165 A | 2/1972 | Rairden, III |
| 3,657,647 A | 4/1972 | Beusman et al. |
| 4,103,135 A | 7/1978 | Gomez et al. |
| 4,200,779 A | 4/1980 | Zakurdaev et al. |
| 4,238,748 A | 12/1980 | Goullin et al. |
| 4,245,886 A | 1/1981 | Kolodzey et al. |
| 4,336,570 A | 6/1982 | Brower |
| 4,419,650 A | 12/1983 | John |
| 4,434,337 A | 2/1984 | Becker |
| 4,475,033 A | 10/1984 | Willemsen et al. |
| 4,505,539 A | 3/1985 | Auracher et al. |
| 4,582,391 A | 4/1986 | Legrand |
| 4,628,161 A | 12/1986 | Thackrey |
| 4,652,710 A | 3/1987 | Karnowsky et al. |
| 4,657,339 A | 4/1987 | Fick |
| 4,742,263 A | 5/1988 | Harnden, Jr. et al. |
| 4,786,130 A | 11/1988 | Georgiou et al. |
| 4,797,519 A | 1/1989 | Elenbaas |
| 4,804,932 A | 2/1989 | Akanuma et al. |
| 4,988,157 A | 1/1991 | Jackel et al. |
| 5,278,012 A | 1/1994 | Yamanaka et al. |
| 5,415,026 A | 5/1995 | Ford |
| 5,502,781 A | 3/1996 | Li et al. |
| 5,644,676 A | 7/1997 | Blomberg et al. |
| 5,675,310 A | 10/1997 | Wojnarowski et al. |
| 5,677,823 A | 10/1997 | Smith |
| 5,751,074 A | 5/1998 | Prior et al. |
| 5,751,552 A | 5/1998 | Scanlan et al. |
| 5,828,799 A | 10/1998 | Donald |
| 5,841,686 A | 11/1998 | Chu et al. |
| 5,849,623 A | 12/1998 | Wojnarowski et al. |
| 5,874,770 A | 2/1999 | Saia et al. |
| 5,875,531 A | 3/1999 | Nellissen et al. |
| 5,886,407 A | 3/1999 | Polese et al. |
| 5,889,325 A | 3/1999 | Uchida et al. |
| 5,912,606 A | 6/1999 | Nathanson et al. |
| 5,915,050 A | 6/1999 | Russell et al. |
| 5,972,737 A | 10/1999 | Polese et al. |
| 5,994,750 A | 11/1999 | Yagi |
| 6,021,048 A | 2/2000 | Smith |
| 6,180,873 B1 | 1/2001 | Bitko |
| 6,201,682 B1 | 3/2001 | Mooij et al. |
| 6,207,234 B1 | 3/2001 | Jiang |
| 6,212,308 B1 | 4/2001 | Donald |
| 6,225,133 B1 | 5/2001 | Yamamichi et al. |
| 6,278,541 B1 | 8/2001 | Baker |
| 6,304,450 B1 | 10/2001 | Dibene, II et al. |
| 6,320,994 B1 | 11/2001 | Donald et al. |
| 6,323,447 B1 | 11/2001 | Kondoh |
| 6,351,579 B1 | 2/2002 | Early et al. |
| 6,356,679 B1 | 3/2002 | Kapany |
| 6,373,356 B1 | 4/2002 | Gutierrez |
| 6,389,189 B1 * | 5/2002 | Edwards et al. ............... 385/18 |
| 6,396,012 B1 | 5/2002 | Bloomfield |
| 6,396,371 B2 | 5/2002 | Streeter et al. |
| 6,408,112 B1 | 6/2002 | Bartels |
| 6,446,317 B1 | 9/2002 | Figueroa et al. |
| 6,453,086 B1 | 9/2002 | Tarazona |
| 6,470,106 B2 | 10/2002 | McClelland et al. |
| 6,487,333 B2 | 11/2002 | Fouquet |
| 6,501,354 B1 | 12/2002 | Gutierrez et al. |
| 6,512,322 B1 | 1/2003 | Wong |
| 6,515,404 B1 | 2/2003 | Wong |
| 6,516,504 B2 | 2/2003 | Schaper |
| 6,559,420 B1 | 5/2003 | Zarev |
| 6,633,212 B1 * | 10/2003 | Ruan et al. .................... 335/78 |
| 6,633,213 B1 | 10/2003 | Dove |
| 6,798,937 B1 * | 9/2004 | Wong .......................... 385/16 |
| 6,803,842 B1 * | 10/2004 | Wong et al. .................. 335/47 |
| 6,816,641 B2 * | 11/2004 | Wong et al. .................. 385/19 |
| 2002/0037128 A1 | 3/2002 | Burger et al. |
| 2002/0146197 A1 | 10/2002 | Yong |
| 2002/0150323 A1 | 10/2002 | Nishida et al. |
| 2002/0168133 A1 | 11/2002 | Saito |
| 2003/0012483 A1 * | 1/2003 | Ticknor et al. ............... 385/16 |
| 2003/0035611 A1 | 2/2003 | Shi |

* cited by examiner

LONGITUDINAL ELECTROMAGNETIC LATCHING OPTICAL RELAY

CROSS REFERENCE TO RELATED APPLICATIONS

This application is related to the following co-pending U.S. patent applications, being identified by the below enumerated identifiers and arranged in alphanumerical order, which have the same ownership as the present application and to that extent are related to the present application and which are hereby incorporated by reference:

Application 10010448-1, titled "Piezoelectrically Actuated Liquid Metal Switch", filed May 2, 2002 and identified by Ser. No. 10/137,691;

Application 10010529-1, "Bending Mode Latching Relay", and having the same filing date as the present application;

Application 10010531-1, "High Frequency Bending Mode Latching Relay", and having the same filing date as the present application;

Application 10010570-1, titled "Piezoelectrically Actuated Liquid Metal Switch", filed May 2, 2002 and identified by Ser. No. 10/142,076;

Application 10010571-1, "High-frequency, Liquid Metal, Latching Relay with Face Contact", and having the same filing date as the present application;

Application 10010572-1, "Liquid Metal, Latching Relay with Face Contact", and having the same filing date as the present application;

Application 10010573-1, "Insertion Type Liquid Metal Latching Relay", and having the same filing date as the present application;

Application 10010617-1, "High-frequency, Liquid Metal, Latching Relay Array", and having the same filing date as the present application;

Application 10010618-1, "Insertion Type Liquid Metal Latching Relay Array", and having the same filing date as the present application;

Application 10010634-1, "Liquid Metal Optical Relay", and having the same filing date as the present application;

Application 10010640-1, titled "A Longitudinal Piezoelectric Optical Latching Relay", filed Oct. 31, 2001 and identified by Ser. No. 09/999,590;

Application 10010643-1, "Shear Mode Liquid Metal Switch", and having the same filing date as the present application;

Application 10010644-1, "Bending Mode Liquid Metal Switch", and having the same filing date as the present application;

Application 10010656-1, titled "A Longitudinal Mode Optical Latching Relay", and having the same filing date as the present application;

Application 10010663-1, "Method and Structure for a Pusher-Mode Piezoelectrically Actuated Liquid Metal Switch", and having the same filing date as the present application;

Application 10010664-1, "Method and Structure for a Pusher-Mode Piezoelectrically Actuated Liquid Metal Optical Switch", and having the same filing date as the present application;

Application 10010790-1, titled "Switch and Production Thereof", filed Dec. 12, 2002 and identified by Ser. No. 10/317,597;

Application 10011055-1, "High Frequency Latching Relay with Bending Switch Bar", and having the same filing date as the present application;

Application 10011056-1, "Latching Relay with Switch Bar", and having the same filing date as the present application;

Application 10011064-1, "High Frequency Push-mode Latching Relay", and having the same filing date as the present application;

Application 10011065-1, "Push-mode Latching Relay", and having the same filing date as the present application;

Application 10011121-1, "Closed Loop Piezoelectric Pump", and having the same filing date as the present application;

Application 10011329-1, titled "Solid Slug Longitudinal Piezoelectric Latching Relay", filed May 2, 2002 and identified by Ser. No. 10/137,692;

Application 10011344-1, "Method and Structure for a Slug Pusher-Mode Piezoelectrically Actuated Liquid Metal Switch", and having the same filing date as the present application;

Application 10011345-1, "Method and Structure for a Slug Assisted Longitudinal Piezoelectrically Actuated Liquid Metal Optical Switch", and having the same filing date as the present application;

Application 10011397-1, "Method and Structure for a Slug Assisted Pusher-Mode Piezoelectrically Actuated Liquid Metal Optical Switch", and having the same filing date as the present application;

Application 10011398-1, "Polymeric Liquid Metal Switch", and having the same filing date as the present application;

Application 10011410-1, "Polymeric Liquid Metal Optical Switch", and having the same filing date as the present application;

Application 10011437-1, "Longitudinal Electromagnetic Latching Relay", and having the same filing date as the present application;

Application 10011458-1, "Damped Longitudinal Mode Optical Latching Relay", and having the same filing date as the present application;

Application 10011459-1, "Damped Longitudinal Mode Latching Relay", and having the same filing date as the present application;

Application 10020013-1, titled "Switch and Method for Producing the Same", filed Dec. 12, 2002 and identified by Ser. No. 10/317,963;

Application 10020027-1, titled "Piezoelectric Optical Relay", filed Mar. 28, 2002 and identified by Ser. No. 10/109,309;

Application 10020071-1, titled "Electrically Isolated Liquid Metal Micro-Switches for Integrally Shielded Microcircuits", filed Oct. 8, 2002 and identified by Ser. No. 10/266,872;

Application 10020073-1, titled "Piezoelectric Optical Demultiplexing Switch", filed Apr. 10, 2002 and identified by Ser. No. 10/119,503;

Application 10020162-1, titled "Volume Adjustment Apparatus and Method for Use", filed Dec. 12, 2002 and identified by Ser. No. 10/317,293;

Application 10020241-1, "Method and Apparatus for Maintaining a Liquid Metal Switch in a Ready-to-Switch Condition", and having the same filing date as the present application;

Application 10020242-1, titled "A Longitudinal Mode Solid Slug Optical Latching Relay", and having the same filing date as the present application;

Application 10020473-1, titled "Reflecting Wedge Optical Wavelength Multiplexer/Demultiplexer", and having the same filing date as the present application;

Application 10020540-1, "Method and Structure for a Solid Slug Caterpillar Piezoelectric Relay", and having the same filing date as the present application;

Application 10020541-1, titled "Method and Structure for a Solid Slug Caterpillar Piezoelectric Optical Relay", and having the same filing date as the present application;

Application 10030438-1, "Inserting-finger Liquid Metal Relay", and having the same filing date as the present application;

Application 10030440-1, "Wetting Finger Liquid Metal Latching Relay", and having the same filing date as the present application;

Application 10030521-1, "Pressure Actuated Optical Latching Relay", and having the same filing date as the present application;

Application 10030522-1, "Pressure Actuated Solid Slug Optical Latching Relay", and having the same filing date as the present application; and Application 10030546-1, "Method and Structure for a Slug Caterpillar Piezoelectric Reflective Optical Relay", and having the same filing date as the present application.

FIELD OF THE INVENTION

The invention relates to the field of optical switching relays, and in particular to an electromagnetically actuated optical relay that latches by means of liquid surface tension.

BACKGROUND

Communications systems using optical signals require the use of optical switches and routers. An early approach to optical switching was to convert the optical signal to an electrical signal, use an electrical switch or router and then convert back to an optical signal. More recently, optical relays have been used in which an electrical control signal is used to control the switching or routing of an optical signal. Optical relays typically switch optical signals by using movable solid mirrors or by using the creation of vapor bubbles to alter the index of refraction inside a cavity. The moveable mirrors may use electrostatic latching mechanisms, whereas bubble switches do not latch. Piezoelectric latching relays either use residual charges in the piezoelectric material to latch, or actuate switch contacts containing a latching mechanism.

Liquid metal is also used in electrical relays. A liquid metal droplet can be moved by a variety of techniques, including electrostatic forces, variable geometry due to thermal expansion/contraction, and pressure gradients. When the dimension of interest shrinks, the surface tension of the liquid metal becomes dominant force over other forces, such as body forces (inertia). Consequently, some micro-electromechanical (MEM) systems utilize liquid metal switching.

SUMMARY

The present invention relates to an optical switch in which a solid slug is moved within a channel and used to block or unblock an optical path passing through the channel. The solid slug is moved by electromagnets. In an exemplary embodiment, the slug is wetted by a liquid, such as liquid metal, that also adheres to wettable metal contact pads within the channel to provide a latching mechanism. An optical signal may be reflected from the wetted surface of the solid slug and switched to an alternative optical path.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to an electro-magnetically actuated optical relay that switches and latches by means of a wettable magnetic solid slug and a liquid. In a preferred embodiment, the relay uses the magnetic field of an electromagnet to displace a solid magnetic slug. The slug blocks or unblocks an optical path, allowing the switching of optical signals. In the absence of the magnetic field, the solid slug is held in place by surface tension in a liquid, preferably a liquid metal such as mercury, which wets between the solid slug and at least one fixed contact pad on the relay housing.

Figure 1:
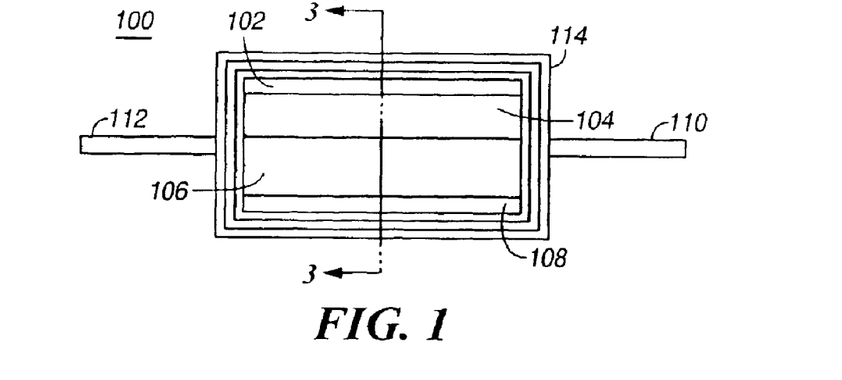
FIG. 1 is an end view of an optical relay in accordance with certain embodiments of the present invention.

In one embodiment, micro-machining techniques are used to manufacture the relay. An end view of an optical relay 100 is shown in FIG. 1. In this embodiment, the body of the relay is made up of four layers and is amenable to manufacture by micro-machining. The lowest layer is a circuit substrate 108 that will be described in more detail below with reference to FIG. 3 and FIG. 5. The next layer is a switching layer 106. The switching of the optical signal occurs in a switching channel contained in this layer. The next layer is vent layer 104 that contains a pressure relief vent for relieving pressure variations in the switching channel. The cap layer 102 provides a seal to the top of the switching channel. In operation, an optical signal enters the relay through an optical fiber or waveguide 110 and exits through optical fiber or waveguide 112. Electric coil 114 is one of several that encircle the relay housing and is used to actuate the switching mechanism.

Figure 2:
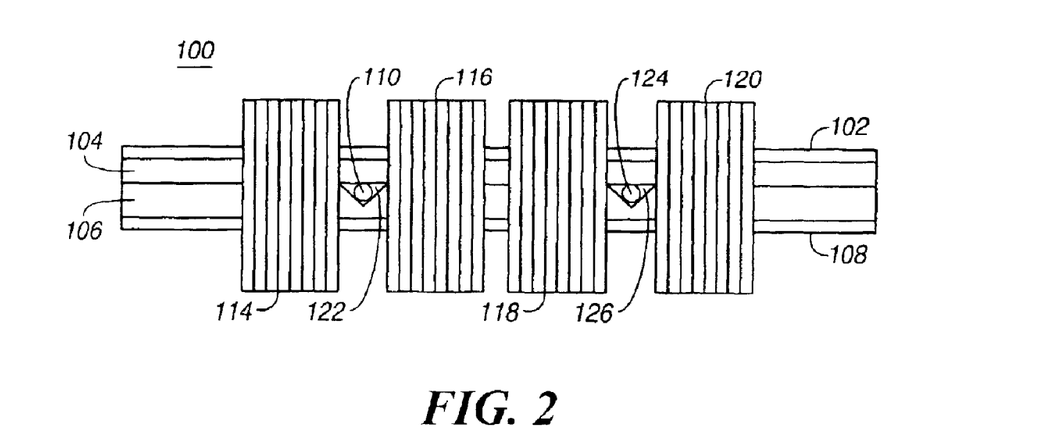
FIG. 2 is a side view of an optical relay in accordance with certain embodiments of the present invention.

FIG. 2 is a side view of the optical relay shown in FIG. 1. Optical fibers 110 and 124 are positioned in alignment notches, 122 and 126 respectively, in the switching layer 106. Each fiber is optically aligned with a corresponding fiber on the opposite side of the relay (as shown in FIG. 1). The optical fibers may be held in place by adhesive. In this embodiment, four electric coils, 114, 116, 118 and 120 encircle the relay housing. The coils 114 and 116 are paired together and act as a single coil, while providing a space between the coils for the optical fiber 110. Coils 118 and 120 are similarly paired to allow space for optical fiber 124. In a further embodiment, only two coils are used.

Figure 3:
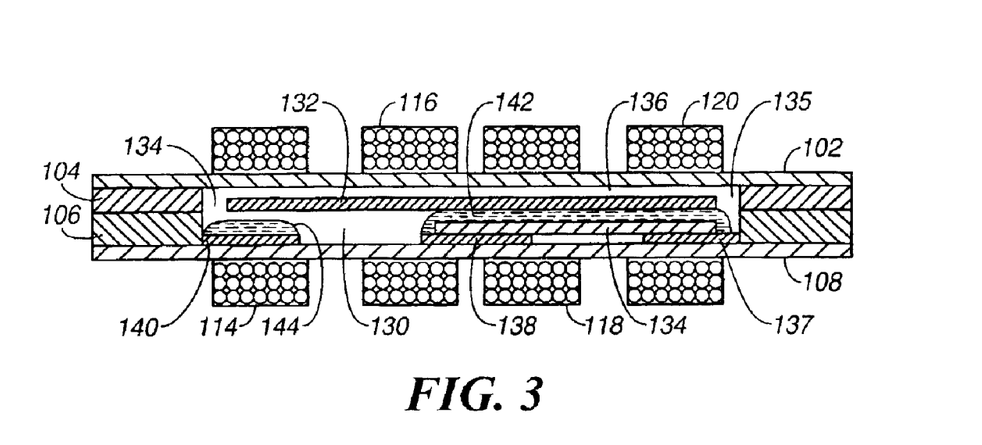
FIG. 3 is a sectional view through an optical relay in accordance with certain embodiments of the present invention.

FIG. 3 is a view of a longitudinal, vertical cross-section through the section 3—3 the relay shown in FIG. 1. A switching channel 130 is formed in the switching layer 106. A solid slug 134 is moveably positioned within the switching channel. A pressure relief vent passage 136 is coupled to the ends of the switching channel 130 by vent holes 134 and 135. The pressure relief vent passage 136 allows pressure variations in the switching channel, due to movement of the solid slug 134, to be equalized by allowing fluid to flow from one end of the switching channel to the other through the vent holes. Three contact pads 137, 138 and 140 are fixed to the circuit substrate 108 within the switching channel. These contact pads may be formed on the circuit substrate 108 by deposition or other micro-machining techniques. The contact pads are wettable by a liquid, such as a liquid metal. When the solid slug 134 is positioned as shown in FIG. 3, a liquid 142 wets the surface of the solid slug and the surface of the contact pads 137 and 138. Surface tension holds the solid slug in this position. Additional liquid 144 wets the contact pad 140.

Figure 4:
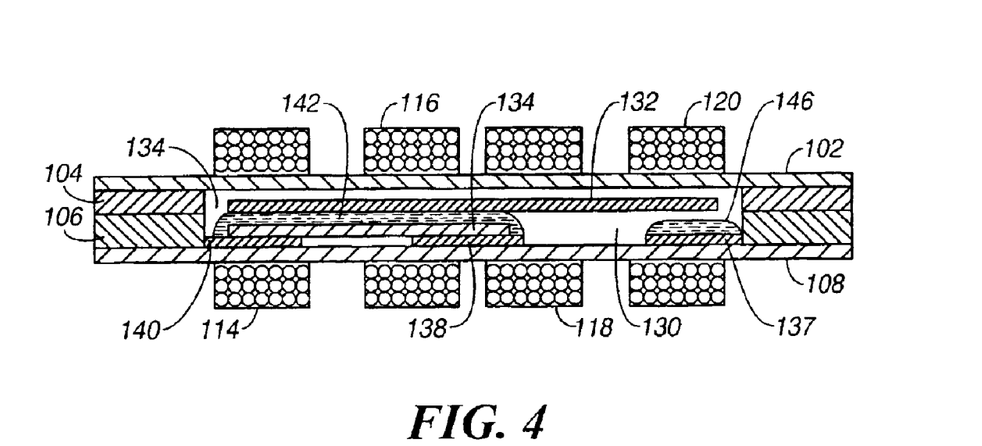
FIG. 4 is a further sectional view through an optical relay in accordance with certain embodiments of the present invention.

When the solid slug occupies the position shown in FIG. 3, the optical path lying between electric coils 118 and 120 is blocked by the slug and the liquid, while the optical path lying between the electric coils 114 and 116 is not blocked. In order to change the switch-state of the relay, the electric coils 114 and 116 are energized by passing an electrical current through the coils. This generates a magnetic field in the switching channel 130 and the solid slug 134 is magnetically attracted towards the coils. The surface tension latch is broken and the solid slug is drawn to the left end of the switching channel, as shown in FIG. 4. The solid slug 134 is then in wetted contact with the contact pads 138 and 140. The electric coils 114 and 116 may now be de-energized, since the solid slug will be held in the new position by surface tension in the liquid. Hence, the relay has been latched in its new position. In this new position, the optical path lying between electric coils 118 and 120 is no longer blocked by the slug and the liquid, whereas the optical path lying between the electric coils 114 and 116 is now blocked.

The switch-state may be changed back to the original state shown in FIG. 3, by energizing the coils 118 and 120 to move the solid slug. Once the solid slug has returned to its original position the coils may be de-energized since the slug is latched into position by surface tension in the liquid.

Figure 5:
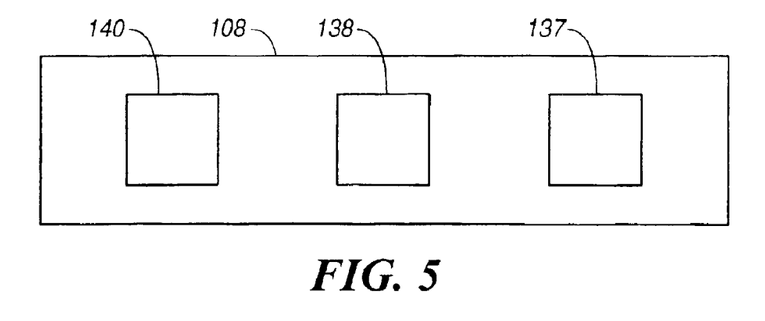
FIG. 5 is a view of a circuit substrate of an optical relay in accordance with certain embodiments of the present invention.

FIG. 5 is a top view of the circuit substrate 108. Three contact pads 137, 138 and 140 are formed on top of the substrate. The surfaces of the contact pads are wettable by the liquid in the switching channel. The contacts pads are preferably constructed of a wettable metal.

Figure 6:
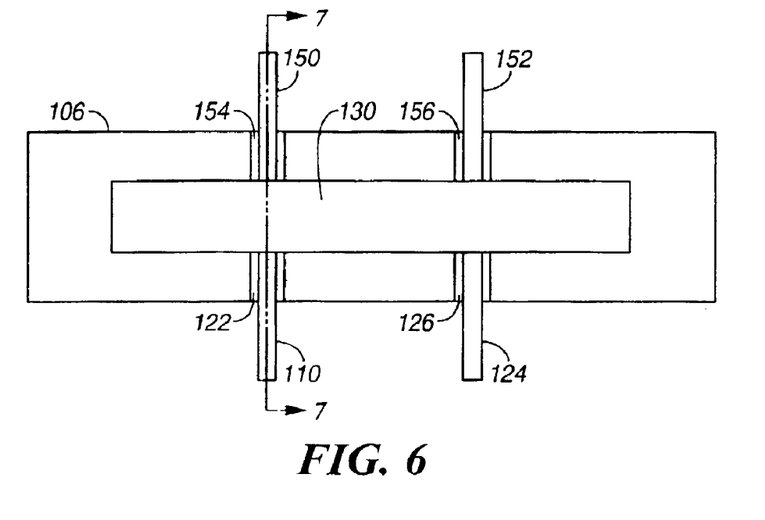
FIG. 6 is a view of a switching layer of an optical relay in accordance with certain embodiments of the present invention.
Figure 7:
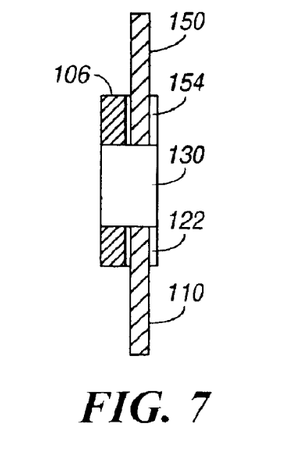
FIG. 7 is a sectional view through a switching layer of an optical relay in accordance with certain embodiments of the present invention.

FIG. 6 is a top view of the switching layer 106. A switching channel 130 is formed in the layer. Optic fibers 110, 124, 150 and 152 are positioned in notches 122, 126, 154 and 156 respectively. The fibers are held in place by an adhesive. Fibers 110 and 150 are optically aligned, so that an optical signal entering the relay along fiber 110 will couple to fiber 150 when the switching channel 130 is unblocked. Similarly, fibers 124 and 152 are optically aligned through the switching channel 130. A sectional view through the section 7—7 is shown in FIG. 7. FIG. 7 shows the switching channel 130 in the layer 106. The optical fiber 110 is positioned in the alignment notch 122 and held in place by adhesive. The optical fiber 150 is positioned in the alignment notch 154 and held in place by adhesive.

Figure 8:
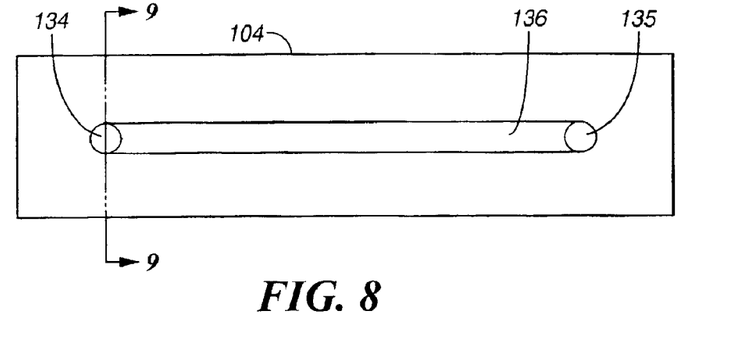
FIG. 8 is a view of a vent layer of an optical relay in accordance with certain embodiments of the present invention.
Figure 9:
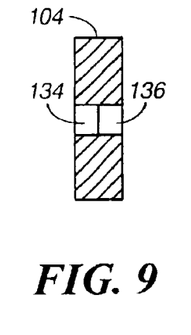
FIG. 9 is a sectional view through a vent layer of an optical relay in accordance with certain embodiments of the present invention.

FIG. 8 is a top view of the vent layer 104. A vent passage or channel 136 is formed in the top of the layer. Vent holes 134 and 135 pass through the layer, coupling the vent passage to the switching channel in the layer below. A sectional view through the section 9—9 is shown in FIG. 9. FIG. 9 shows the vent passage 136 and the vent hole 134. The vent holes may be sized and positioned to dampen the motion of the solid slug, by restricting the flow of fluid through the vent holes from the switching channel.

Figure 10:
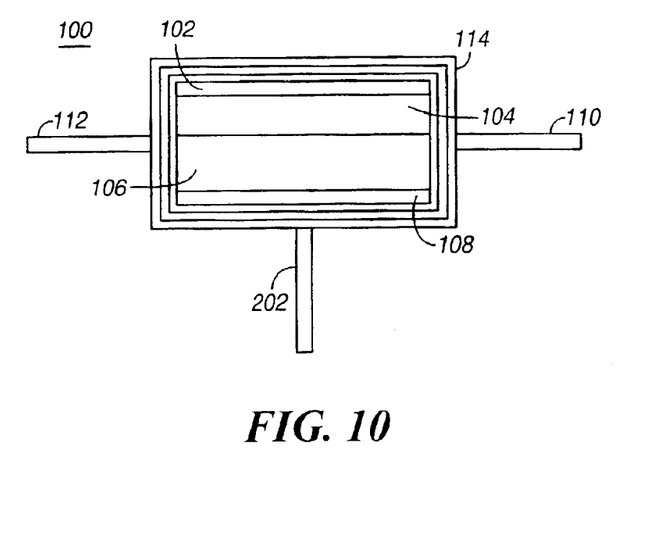
FIG. 10 is an end view of an optical relay in accordance with certain embodiments of the present invention.

An end view of a further embodiment of an optical relay 100 is shown in FIG. 10. In operation, an optical signal enters the relay through an optical fiber or waveguide 110 and either transmitted in a direct path to exit through optical fiber or waveguide 112 or is reflected and exits through waveguide 202. Electric coil 114 is one of several that encircle the relay housing and is used to actuate the switching mechanism.

Figure 11:
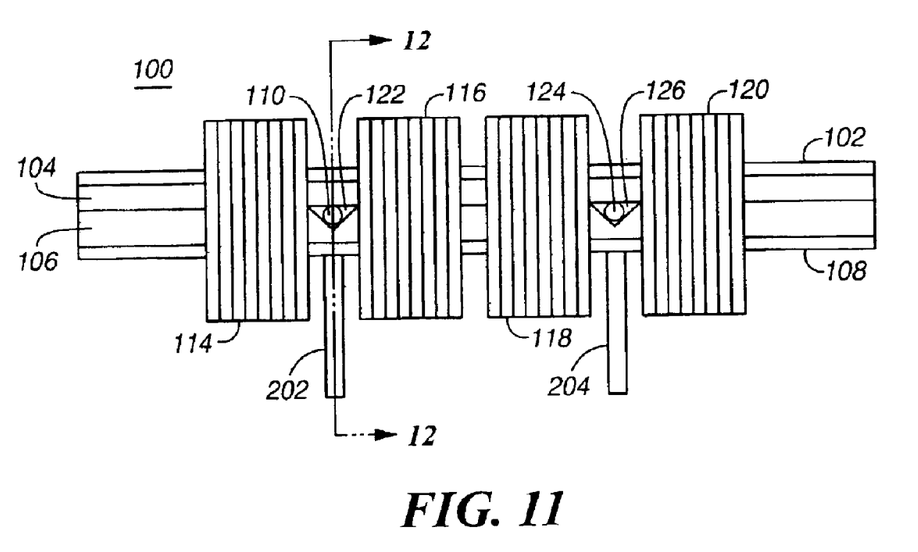
FIG. 11 is a side view of an optical relay in accordance with certain embodiments of the present invention.

FIG. 11 is a side view of the optical relay shown in FIG. 10. Optical fibers 110 and 124 are positioned in alignment notches, 122 and 126 respectively, in the switching layer 106. Each fiber is optically aligned with a corresponding fiber on the opposite side of the relay (as shown in FIG. 10). The optical fibers may be held in place by adhesive. In this embodiment, four electric coils, 114, 116, 118 and 120 encircle the relay housing. The coils 114 and 116 are paired together and act as a single coil, while providing a space between the coils for the optical fiber 110. Coils 118 and 120 are similarly paired to allow space for optical fiber 124. In a further embodiment, only two coils are used. In operation, an optical signal entering the relay through waveguide 110 may be transmitted through a direct path or reflected along output waveguide or optical fiber 202. Similarly, an optical signal entering the relay through waveguide 124 may be transmitted through a direct path or reflected along output waveguide or optical fiber 204. The section 12—12 is described below with reference to FIG. 12.

Figure 12:
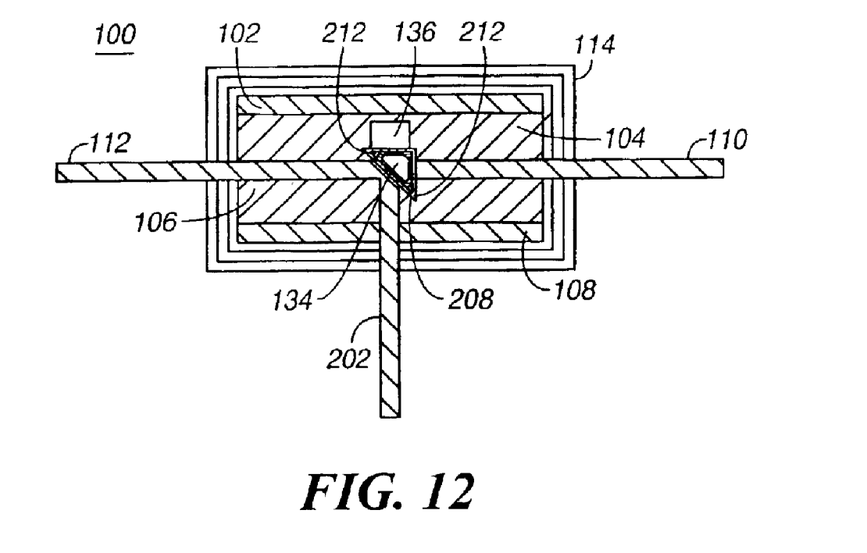
FIGS. 12–13 are further sectional views through an optical relay in accordance with certain embodiments of the present invention.
Figure 13:
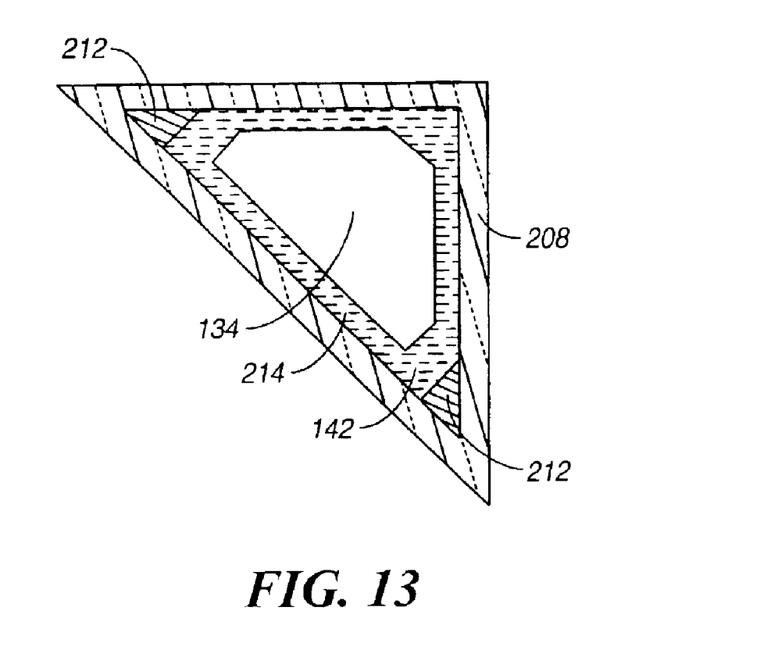

FIG. 12 is a sectional view of a further embodiment of an optical relay 100 of one embodiment of the present invention; FIG. 13 provides a more detailed view of the transparent mirror housing, referred to as transparent, hollow tube 208 that contains solid slug 134. Referring to FIG. 12, the relay contains an input optical waveguide 112 and a first output optical waveguide 110. These paths are optically aligned to form a direct optical path through the layer. A second optical output waveguide 202 intersects the direct optical path. In operation, an optical signal enters path 112 (from the left in the figure) and either passes directly through the relay via path 110 or is deflected to exit the relay through path 202. A transparent, hollow tube 208 is located at the intersection of the paths 112 and 202. The transparent, hollow tube 208 is also referred to as a transparent mirror housing in the sequel. Tubes having other than triangular cross-sectional shapes may be used, however, one face of the tube should be planar and angled so that the normal to the face bisects the angle between the waveguide 110 and the waveguide 202. In FIG. 12, the paths are at right angles, so the face is angled at 45°. Other angles may be used without departing from the present invention. A solid slug of material 134 is positioned in a channel that passes through the transparent tube 108, and is free to slide axially along the channel. A liquid metal 142 is also contained within the channel. The surface of the solid slug 134, other than the ends, is wettable by the liquid metal, so surface tension holds the liquid metal in contact with the surface of the slug. Where the transparent tube passes through the optical paths, at least two corners of the transparent tube are filled with a wettable metal 212. The liquid metal 142 is drawn across the face of the slug by the surface tension attracting the liquid metal to the wettable metal in the corners of the tube. As a result, the surface 214 of the liquid metal is planar and highly reflective. An optical signal entering the channel 112 is reflected from the surface 214 of the liquid metal and exits the relay through channel 202. When the solid slug 134 is moved out of the path of the optical signal, the optical signal passes through the transparent tube and exits the relay through waveguide 110. In operation, the solid slug 134 moves axially along the channel through the transparent tube, attracted by the electromagnetic field generated by the coils. Displaced gas within the channel is allowed to flow from one end of the channel to the other via a vent 136.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An electromagnetic optical relay comprising:
   a relay housing containing a switching channel;
   a first optical path passing through the switching channel;
   a solid slug adapted to move within the switching channel;
   a first electromagnetic actuator operable to move the solid slug to a first position within the switching channel to block the first optical path; and
   a second electromagnetic actuator operable to move the solid slug to a second position within the switching channel to unblock the first optical path.

2. An electromagnetic optical relay in accordance with claim 1, wherein at least one of the first and second electromagnetic actuators comprises an electrical coil surrounding the switching channel.

3. An electromagnetic optical relay in accordance with claim 1, wherein the first electromagnetic actuator comprises a pair of electrical coils surrounding the switching channel, the coils being spaced to allow passage of the first optical path between them.

4. An electromagnetic optical relay in accordance with claim 1, further comprising a pressure relief vent opening to and connecting the ends of the switch channel, the vent adapted to relieve pressure in the channel when the solid slug is moved.

5. An electromagnetic optical relay in accordance with claim 4, wherein the pressure-relief vent is sized and positioned to dampen motion of the solid slug.

6. An electromagnetic optical relay in accordance with claim 1, wherein the solid slug is magnetic.

7. An electromagnetic optical relay comprising:
   a relay housing containing a switching channel;
   a first optical path passing through the switching channel;
   a solid slug and adapted to move within the switching channel, the
   solid slug having a surface wettable by a liquid;
   a first electromagnetic actuator operable to move the solid slug to a first position within the switching channel to block the first optical path;
   a second electromagnetic actuator operable to move the solid slug to a second position within the switching channel to unblock the first optical path;
   a first contact pad located in the switching channel and having a surface wettable by a liquid;
   a second contact pad located in the switching channel and having a surface wettable by a liquid; and
   a liquid volume in wetted contact with the solid slug;
   wherein the liquid volume is adapted to wet between the solid slug and the first contact pad when the solid slug is in the first position and to wet between the solid slug and the second contact pad when the solid slug is in the second position.

8. An electromagnetic optical relay in accordance with claim 7, further comprising:
   a third contact pad located in the switching channel between the first and second contact pads, the third contact being in wetted contact with the liquid volume.

9. An electromagnetic optical relay in accordance with claim 8, wherein the first optical path lies between the first and third contact pads.

10. An electromagnetic optical relay in accordance with claim 9, further comprising a second optical path, lying between the second and third contact pads.

11. An electromagnetic optical relay in accordance with claim 10, wherein the second electromagnetic actuator comprises a pair of electrical coils surrounding the switching channel, the coils being spaced to allow passage of the second optical path between them.

12. An electromagnetic optical relay in accordance with claim 7, wherein the liquid is a liquid metal.

13. An electromagnetic optical relay in accordance with claim 7, further comprising:
   a second optical path passing through the switching channel; and
   a transparent mirror housing, located in the relay housing at the intersection of the first input optical path and the second output optical path, wherein the switching channel passes through the transparent mirror housing.

14. An electromagnetic optical relay in accordance with claim 13, wherein the solid slug has a planar surface wettable by liquid metal.

15. An electromagnetic optical relay in accordance with claim 7, wherein the first optical path comprises an input optical waveguide optically aligned with an output optical waveguide.

16. A method for operating the electromagnetic optical relay of claim 15, comprising:
- coupling an input optical signal to the input optical waveguide;
- if the optical path is to be completed:
  - energizing a first electromagnetic actuator to move the solid slug out of the optical path, whereby the input optical waveguide is optically coupled to the output optical waveguide; and
- if the optical path is to be broken:
  - energizing a second electromagnetic actuator to move the solid slug into the optical path, whereby the input optical waveguide is optically decoupled from the output optical waveguide.

17. A method in accordance with claim 16, wherein motion of the solid slug is resisted by a liquid that wets between the solid slug and at least one contact pad of a plurality of fixed contact pads in the switching channel, the method further comprising:
- if the optical path is to be completed:
  - de-energizing the first electromagnetic actuator after the solid slug has been moved out of the optical path; and
- if the optical path is to be broken:
  - de-energizing the second electromagnetic actuator after the solid slug has been moved into the optical path.

18. An electromagnetic optical relay comprising:
- a relay housing containing a switching channel;
- a first optical path passing through the switching channel;
- a solid slug adapted to move within the switching channel;
- a first electromagnetic actuator operable to move the solid slug to a first position within the switching channel to block the first optical path; and
- a second electromagnetic actuator operable to move the solid slug to a second position within the switching channel to unblock the first optical path;
- wherein the relay housing comprises:
  - a circuit substrate layer;
  - a cap layer; and
  - a switching layer, positioned between the circuit layer and the cap layer, in which the switching channel is formed.

19. An electromagnetic optical relay in accordance with claim 18, wherein the relay housing further comprises:
- a vent layer containing a pressure relief vent opening to and connecting the ends of the switch channel.

20. An electromagnetic optical relay in accordance with claim 18, further comprising
- a first optical waveguide positioned in a first alignment notch in the switching layer; and
- a second optical waveguide positioned in a second alignment notch in the switching layer;
- wherein the first and second optical waveguides are axially aligned to form a portion of the first optical path.

21. An electromagnetic optical relay in accordance with claim 20, wherein the first and second optical waveguides are held in the first and second alignment notches respectively by adhesive.

22. An electromagnetic optical relay comprising:
- a relay housing;
- a first input optical path;
- a first output optical path, optically aligned with the first input optical path to form a direct optical path;
- a second output optical path intersecting the first input optical path;
- a transparent mirror housing, located in the relay housing at the intersection of the first input optical path and the second output optical path;
- a solid slug adapted to move within a channel passing through the transparent mirror housing, the solid slug having a planar surface wettable by liquid metal;
- a liquid metal volume covering the planar face of the solid slug to form a reflective surface;
- a first electromagnetic actuator operable to move the solid slug within the channel so that it blocks the direct optical path and completes a reflected optical path from the first input optical path to the second output optical path; and
- a second electromagnetic actuator operable to move the solid slug within the channel to remove it from the direct optical path.

23. An electromagnetic optical relay in accordance with claim 22, further comprising a metal coating applied to a portion of the interior of the transparent mirror housing, the metal coating being wettable by liquid metal.

24. An electromagnetic optical relay in accordance with claim 23, wherein the transparent mirror housing is a triangular tube and the metal coating is applied to the corners of the transparent mirror housing, the metal coating tending to cause the liquid metal to form a reflective surface covering the planar surface of the solid slug.

25. An electromagnetic optical relay in accordance with claim 23, wherein the metal coating is applied to the interior of the channel above and below the direct and reflected optical paths so that liquid metal fills gaps between the solid slug and the metal coating and resists motion of the solid slug.

26. An electromagnetic optical relay in accordance with claim 22, wherein the transparent mirror housing is coated with a wettable metal above and below the direct and reflected optical paths so that liquid metal fills gaps between the solid slug and the wettable metal coating and resists motion of the solid slug.

27. A method for switching an optical path in a electromagnetic optical relay having solid slug moveable within a switching channel, the method comprising:
- coupling an input optical signal to an input optical waveguide of the electromagnetic optical relay, the input optical waveguide being optically aligned with an output optical waveguide to form the optical path;
- if the optical path is to be completed:
  - energizing a first electromagnetic actuator to move the solid slug out of the optical path, whereby the input optical waveguide is optically coupled to the output optical waveguide; and
- if the optical path is to be broken:
  - energizing a second electromagnetic actuator to move the solid slug into the optical path, whereby the input optical waveguide is optically decoupled from the output optical waveguide.

28. A method in accordance with claim 27, wherein energizing the first electromagnetic actuator comprises passing an electrical current through at least one first coil encircling the switching channel and energizing the second electromagnetic actuator comprises passing an electrical current through at least one second coil encircling the switching channel.

29. A method in accordance with claim 27, wherein motion of the solid slug is resisted by a liquid that wets between the solid slug and at least one contact pad of a plurality of fixed contact pads in the switching channel, the method further comprising:

if the optical path is to be completed:
de-energizing the first electromagnetic actuator after the solid slug has been moved out of the optical path; and if the optical path is to be broken:
de-energizing the second electromagnetic actuator after the solid slug has been moved into the optical path.

30. A method for switching between a first optical path and a second optical path through a switching channel in a electromagnetic optical relay, the relay having a solid slug moveable within the switching channel and the method comprising:

coupling a first input optical signal to a first input optical waveguide of the electromagnetic optical relay, the first input optical waveguide being optically aligned with a first output optical waveguide to form the first optical path;

coupling a second input optical signal to a second input optical waveguide of the electromagnetic optical relay, the second input optical waveguide being optically aligned with a second output optical waveguide to form the second optical path;

if the first optical path is to be selected:
energizing a first electromagnetic actuator to move the solid slug out of the first optical path and into the second optical path, whereby the first input optical waveguide is optically coupled to first output optical waveguide and the second input optical waveguide is optically decoupled from the second output optical waveguide; and if the second optical path is to be selected:
energizing the second electromagnetic actuator to move the solid slug out of the second optical path and into the first optical path, whereby the first input optical waveguide is optically decoupled from first output optical waveguide and the second input optical waveguide is optically coupled to the second output optical waveguide.

31. A method in accordance with claim 30, wherein energizing the first electromagnetic actuator comprises passing an electrical current through at least one first coil encircling the switching channel.

32. A method in accordance with claim 30, wherein motion of the solid slug is resisted by a liquid that wets between the solid slug and a fixed contact pad in the switching channel, the method further comprising:

if the first optical path is to be selected:
de-energizing the first electromagnetic actuator after the solid slug has been moved out of the first optical path; and if the second optical path is to be selected:
de-energizing a second electromagnetic actuator after the solid slug has been moved out of the second optical path.

* * * * *